United States Patent
Ichida et al.

(10) Patent No.: US 10,737,565 B2
(45) Date of Patent: Aug. 11, 2020

(54) FUEL CELL VEHICLE

(71) Applicant: Toyota Jidosha Kabushiki Kaisha, Toyota-shi, Aichi-ken (JP)

(72) Inventors: Yugo Ichida, Seto (JP); Hiroaki Nishiumi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 82 days.

(21) Appl. No.: 16/226,006

(22) Filed: Dec. 19, 2018

(65) Prior Publication Data

US 2019/0193547 A1    Jun. 27, 2019

(30) Foreign Application Priority Data

Dec. 25, 2017 (JP) ................................. 2017-248034

(51) Int. Cl.
| | |
|---|---|
| *B60K 1/04* | (2019.01) |
| *B62D 21/15* | (2006.01) |
| *H01M 8/2475* | (2016.01) |
| *B62D 25/08* | (2006.01) |
| *B60K 1/00* | (2006.01) |

(52) U.S. Cl.
CPC ............... *B60K 1/04* (2013.01); *B62D 21/15* (2013.01); *H01M 8/2475* (2013.01); *B60K 2001/005* (2013.01); *B60K 2001/0411* (2013.01); *B60Y 2306/01* (2013.01); *B62D 25/082* (2013.01); *H01M 2250/20* (2013.01)

(58) Field of Classification Search
CPC ............... B60K 1/04; B60K 2001/005; B60K 2001/0411; B62D 21/15; B62D 25/082; H01M 8/2475; H01M 2250/20; B60Y 2306/01
See application file for complete search history.

(56) References Cited

U.S. PATENT DOCUMENTS

| | | | |
|---|---|---|---|
| 2015/0174996 A1* | 6/2015 | Ikeda | H01M 2/1083 180/68.5 |
| 2015/0180078 A1* | 6/2015 | Ikeda | B60L 50/72 180/68.5 |
| 2015/0249240 A1* | 9/2015 | Hihara | B62D 21/157 180/68.5 |
| 2017/0066479 A1 | 3/2017 | Murata | |

(Continued)

FOREIGN PATENT DOCUMENTS

| | | |
|---|---|---|
| JP | 2017047842 A | 3/2017 |
| JP | 2017074819 A | 4/2017 |

(Continued)

*Primary Examiner* — Lori L Lyjak
(74) *Attorney, Agent, or Firm* — Dinsmore & Shohl LLP

(57) ABSTRACT

A fuel cell vehicle capable of reducing an impact on a fuel cell stack thereof in the vehicle-width direction is provided. The fuel cell vehicle includes: the fuel cell stack; a stack frame to which the fuel cell stack is adapted to be mounted, and disposed in a front compartment of the vehicle; and a pair of front side members disposed on both the right and left sides of the stack frame and disposed to extend in the vehicle front-rear direction. The fuel cell stack is disposed so as to be fitted within the width in the vehicle-width direction of the stack frame in the vehicle-width direction. The stack frame entirely overlaps the front side members when viewed in the vehicle-width direction.

5 Claims, 6 Drawing Sheets

(56) References Cited

U.S. PATENT DOCUMENTS

| | | |
|---|---|---|
| 2017/0101031 A1 | 4/2017 | Ohashi |
| 2017/0232829 A1* | 8/2017 | Nishikawa ............... B60K 1/04 180/68.5 |
| 2017/0244128 A1* | 8/2017 | Naito ................... H01M 8/2475 |
| 2017/0267301 A1 | 9/2017 | Katano et al. |

FOREIGN PATENT DOCUMENTS

| | | |
|---|---|---|
| JP | 2017144859 A | 8/2017 |
| JP | 2017168241 A | 9/2017 |

* cited by examiner

FUEL CELL VEHICLE

CROSS REFERENCE TO RELATED APPLICATIONS

The present application claims priority from Japanese patent application JP 2017-248034 filed on Dec. 25, 2017, the content of which is hereby incorporated by reference into this application.

BACKGROUND

Technical Field

The present disclosure relates to a fuel cell vehicle.

Background Art

As a conventional technique in such a field, for example, there has been a technique disclosed in JP 2017-74819 A. A fuel cell vehicle disclosed in this patent literature includes a stack frame disposed in a front compartment of the vehicle, and a fuel cell stack is mounted to the stack frame.

SUMMARY

However, the above-described fuel cell vehicle receives an impact in the vehicle-width direction in some cases, and this may cause an adverse effect on the fuel cell stack. In view of this, it has been desired that the impact on the fuel cell stack in the vehicle-width direction be reduced.

The present disclosure has been made to solve such a technical problem and provides a fuel cell vehicle capable of reducing an impact on a fuel cell stack thereof in the vehicle-width direction.

A fuel cell vehicle according to the present disclosure includes a fuel cell stack, a stack frame, and a pair of front side members. The fuel cell stack includes a plurality of stacked fuel cells. The fuel cell stack is mounted to the stack frame. The stack frame is disposed in a front compartment of the vehicle. The pair of front side members are disposed on both sides of the stack frame in a vehicle-width direction. The pair of front side members are disposed to extend in the vehicle front-rear direction. The fuel cell stack is disposed so as to be fitted within the width in the vehicle-width direction of the stack frame in the vehicle-width direction. At least a part of the stack frame overlaps each front side member when viewed in the vehicle-width direction.

In the fuel cell vehicle according to the present disclosure, the fuel cell stack is disposed so as to be fitted within the width in the vehicle-width direction of the stack frame in the vehicle-width direction, and at least a part of the stack frame overlaps each front side members when viewed in the vehicle-width direction. Thus, when an impact is applied to the fuel cell vehicle in the vehicle-width direction, the applied impact is absorbed by the front side members and the stack frame in sequence, so as to ease the impact on the fuel cell stack. Consequently, the impact on the fuel cell stack in the vehicle-width direction can be reduced.

The fuel cell vehicle according to the present disclosure may further include a front bumper reinforcement disposed ahead of the stack frame. The fuel cell stack may be disposed so as to be fitted within the width in the vehicle front-rear direction of the stack frame in the vehicle front-rear direction. At least a part of the stack frame may overlap the front bumper reinforcement when viewed from the vehicle front side. Accordingly, an impact applied to the fuel cell vehicle from the vehicle front side is absorbed by the front bumper reinforcement and the stack frame in sequence, so as to ease the impact on the fuel cell stack. Consequently, the impact on the fuel cell stack from the vehicle front side can be reduced.

In the fuel cell vehicle according to the present disclosure, the stack frame may entirely overlap the front bumper reinforcement when viewed from the vehicle front side. Accordingly, the impact on the fuel cell stack from the vehicle front side can be reduced with more certainty.

In the fuel cell vehicle according to the present disclosure, the stack frame may entirely overlap the front side member when viewed in the vehicle-width direction. Accordingly, the impact on the fuel cell stack in the vehicle-width direction can be reduced with more certainty.

The fuel cell vehicle according to the present disclosure may further include an auxiliary machine adapted to be used for the fuel cell stack. The auxiliary machine may be disposed so as to be fitted at least one of within the width in the vehicle-width direction of the stack frame in the vehicle-width direction or within the width in the vehicle front-rear direction of the stack frame in the vehicle front-rear direction. Accordingly, the impact applied to the fuel cell vehicle in the vehicle-width direction is absorbed by the front side members and the stack frame in sequence, so as to ease the impact on the auxiliary machine. In addition, the impact applied to the fuel cell vehicle from the vehicle front side is absorbed by the front bumper reinforcement and the stack frame in sequence, so as to ease the impact on the auxiliary machine. Consequently, the impact on the auxiliary machine at least one of in the vehicle-width direction and from the vehicle front side can be reduced.

With the present disclosure, the impact on the fuel cell stack in the vehicle-width direction can be reduced.

DETAILED DESCRIPTION

Figure 1:
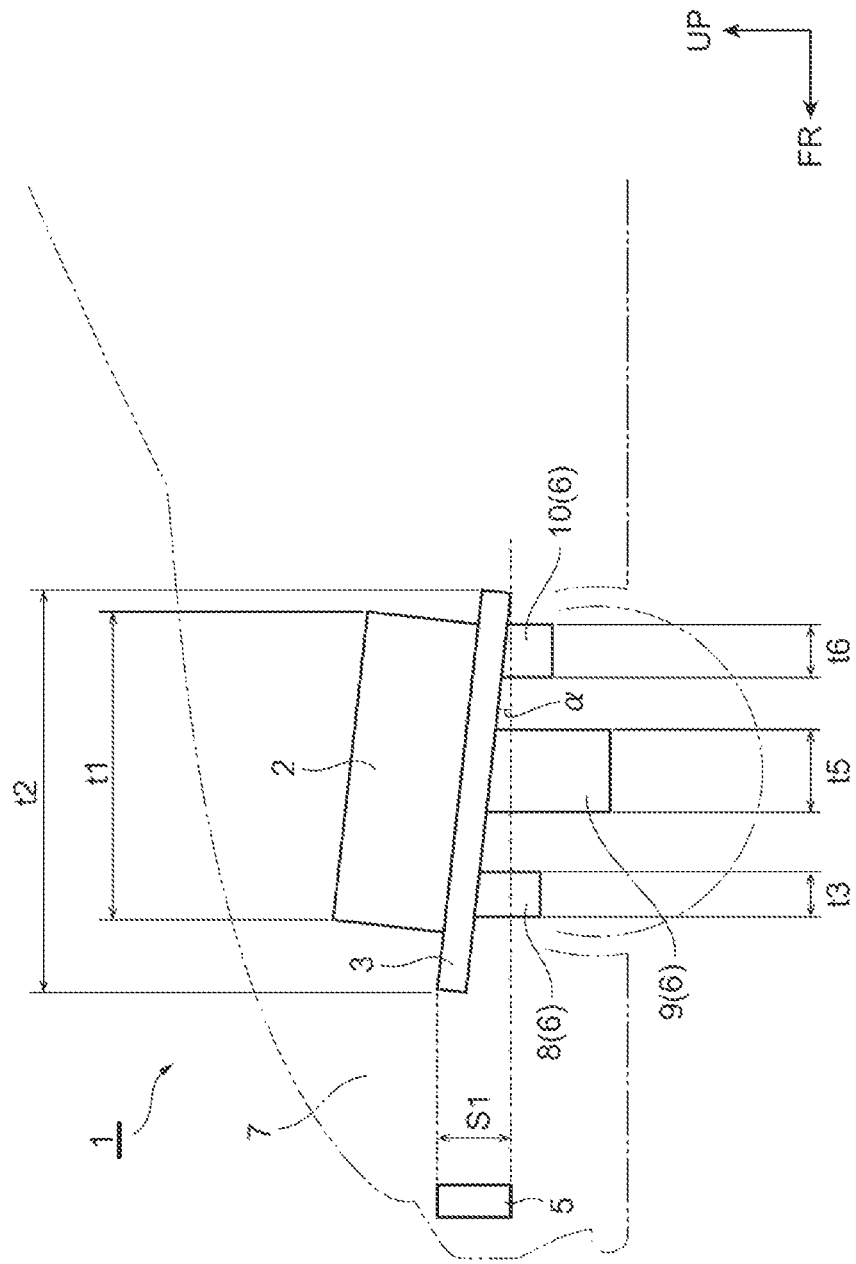
FIG. 1 is a schematic side view of a fuel cell vehicle according to a first embodiment.

The following describes embodiments of a fuel cell vehicle according to the present disclosure with reference to the drawings. In the description of the drawings, identical reference numerals are given to identical elements, and therefore such elements will not be further elaborated here. In each drawing, an arrow FR, an arrow RH, and an arrow UP indicate the vehicle front side, the vehicle right side, and the vehicle upper side, respectively.

First Embodiment

Figure 2:
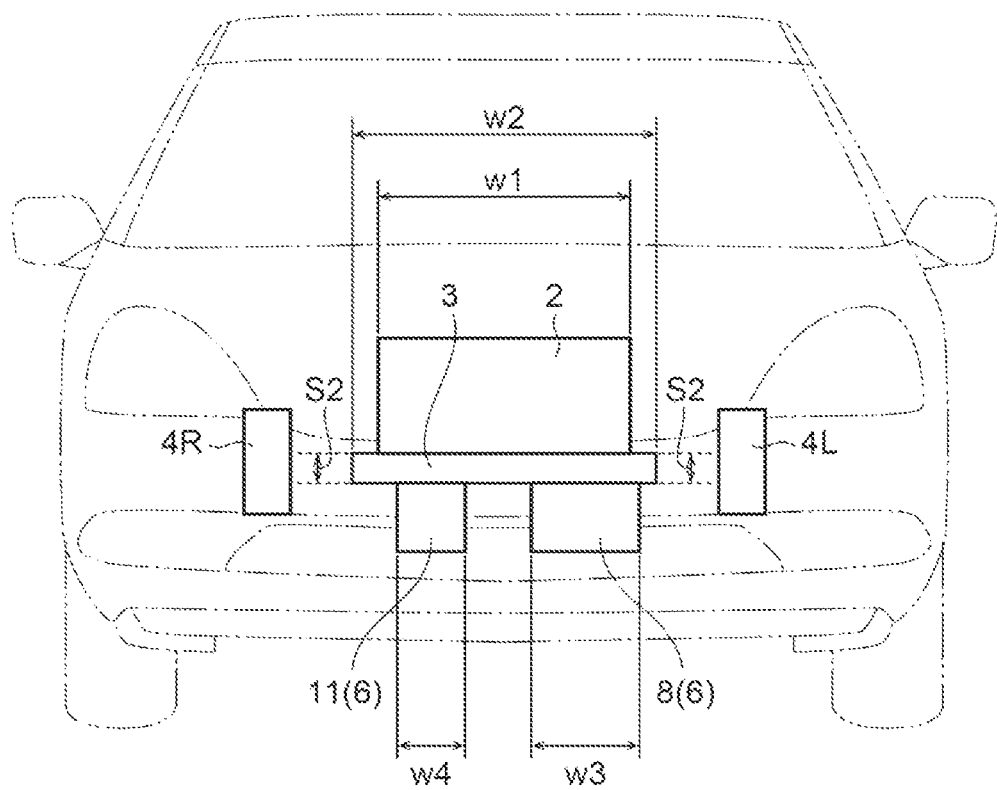
FIG. 2 is a schematic front view of the fuel cell vehicle according to the first embodiment.
Figure 3:
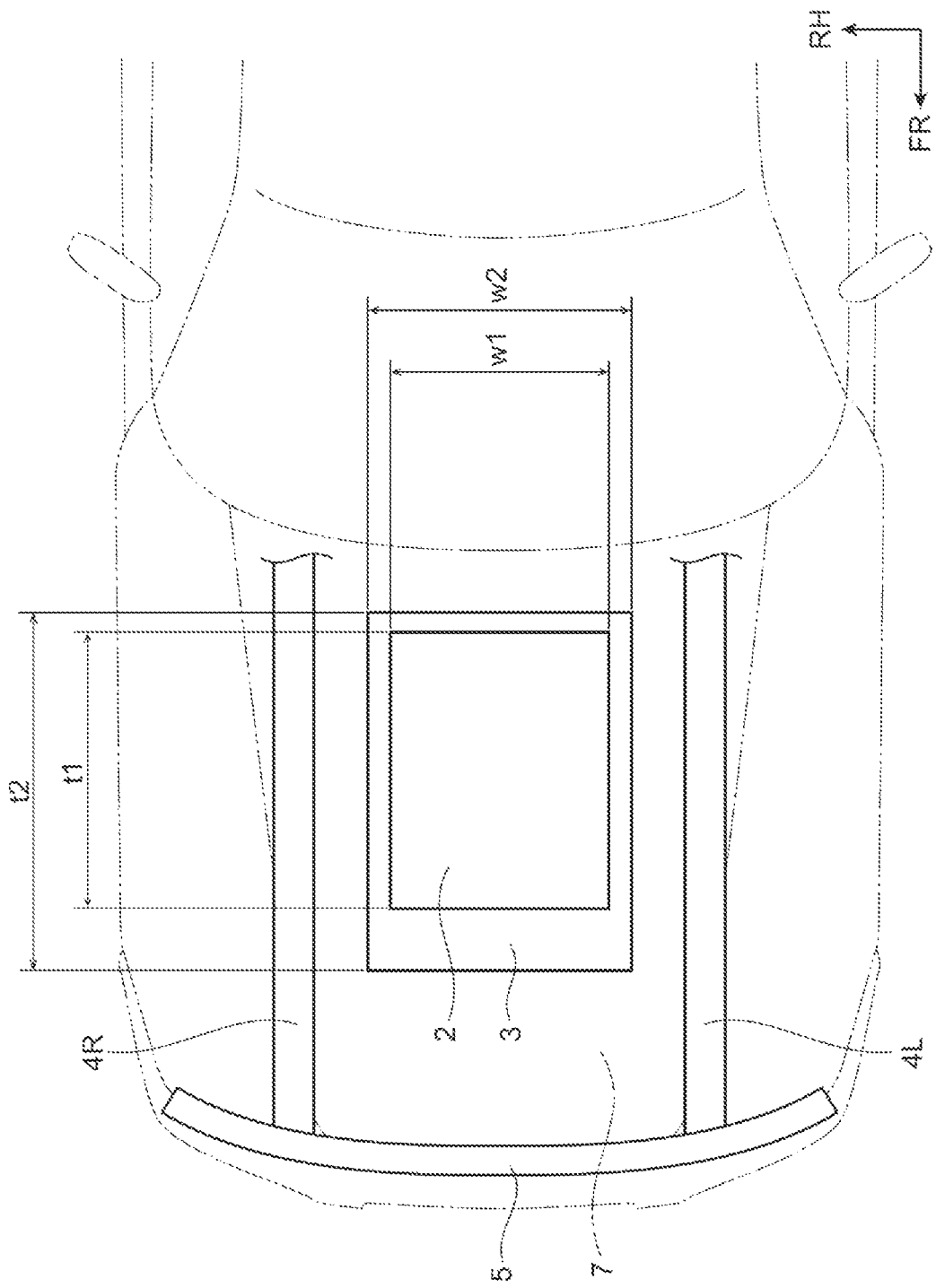
FIG. 3 is a schematic plan view of the fuel cell vehicle according to the first embodiment.
Figure 4:
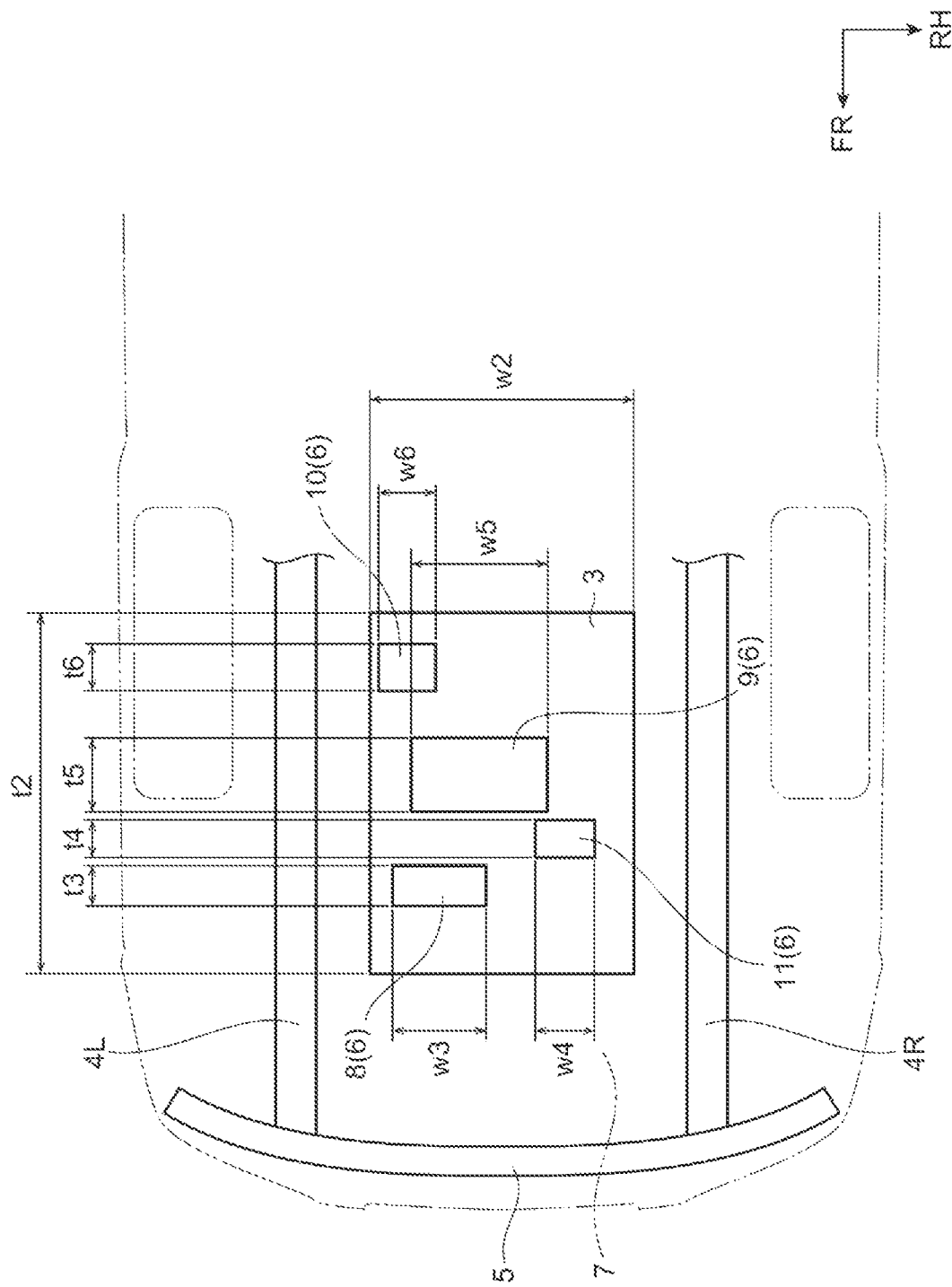
FIG. 4 is a schematic bottom view of the fuel cell vehicle according to the first embodiment.

FIG. 1 is a schematic side view of a fuel cell vehicle according to the first embodiment, FIG. 2 is a schematic front view of the fuel cell vehicle according to the first embodiment, FIG. 3 is a schematic plan view of the fuel cell vehicle according to the first embodiment, and FIG. 4 is a schematic bottom view of the fuel cell vehicle according to the first embodiment. In FIG. 2, for more easy understanding of the positional relationship among a fuel cell stack, a stack frame, front side members, and the like, a front bumper reinforcement arranged ahead of these components is omitted.

A fuel cell vehicle 1 of this embodiment is, for example, a rear-wheel drive vehicle, and mainly includes a fuel cell stack 2, a stack frame 3, a pair of left and right front side members 4L and 4R, a front bumper reinforcement 5, and auxiliary machines 6. The fuel cell stack 2 is disposed inside a front compartment 7 of the vehicle. The stack frame 3 is disposed inside the front compartment 7, and the fuel cell stack 2 is mounted to the stack frame 3. The front side members 4L and 4R are disposed on both sides of the stack frame 3 in the vehicle-width direction (also referred to as a vehicle right-left direction). The front bumper reinforcement 5 is disposed ahead of the stack frame 3. The auxiliary machines 6 are adapted to be used for the fuel cell stack 2.

The fuel cell stack 2 is a cell stack formed by stacking a plurality of fuel cells and constitutes a solid polymer electrolyte fuel cell. Although not illustrated, the fuel cell includes a membrane electrode assembly formed by an anode electrode and a cathode electrode sandwiching a polymer electrolyte membrane and a pair of separators that sandwich the membrane electrode assembly from both sides. The fuel cell stack 2 performs electric generation through a redox reaction between an oxygen gas in air supplied via the separator on the cathode electrode side and a hydrogen gas supplied via the separator on the anode electrode side.

The stack frame 3 is, for example, formed in a rectangular plate shape using a metallic material, and disposed below the fuel cell stack 2. The fuel cell stack 2 is secured to the stack frame 3 by, for example, welding or bolt fastening. Although not illustrated, the stack frame 3 is fastened to the vehicle via, for example, a mount.

As illustrated in FIG. 1, the stack frame 3 is disposed inside the front compartment 7 in a state where the bottom surface of the stack frame 3 is inclined at a predetermined angle $\alpha$ with respect to the horizontal direction. Specifically, the stack frame 3 is inclined so as to be lower toward the vehicle rear side, in other words, inclined downward to the rear. This also inclines the fuel cell stack 2, which is mounted to this stack frame 3, downward to the rear with respect to the horizontal direction. This configuration ensures efficient discharge of water generated during the electric generation of the fuel cell to the outside. Note that it is not necessarily required to dispose the stack frame 3 and the fuel cell stack 2 such that they are inclined downward to the rear, and the stack frame 3 and the fuel cell stack 2 may be disposed such that they are inclined downward to the front.

In this embodiment, the fuel cell stack 2 is disposed so as to be fitted within the width in the vehicle-width direction of the stack frame 3 in the vehicle-width direction, and disposed so as to be fitted within the width in the vehicle front-rear direction of this stack frame 3 in the vehicle front-rear direction. Specifically, the fuel cell stack 2 has a maximum width t1 in the vehicle front-rear direction smaller than a maximum width t2 in the vehicle front-rear direction of the stack frame 3, and the maximum width t1 is within the range of the maximum width t2 (see FIG. 1 and FIG. 3). In addition, the fuel cell stack 2 has a maximum width w1 in the vehicle-width direction smaller than a maximum width w2 in the vehicle-width direction of the stack frame 3, and the maximum width w1 is within the range of this maximum width w2 (see FIG. 2 and FIG. 3).

The front side members 4L and 4R are frame members of a vehicle body each formed in, for example, a rectangular closed cross-sectional shape when viewed in the vehicle front-rear direction, and the front side members 4L and 4R are disposed to extend along the vehicle front-rear direction. As illustrated in FIG. 2 and FIG. 3, the front side members 4L and 4R are disposed on both the left and right sides of this stack frame 3 so as to sandwich the stack frame 3.

Meanwhile, the front bumper reinforcement 5 is disposed on the front ends of the front side members 4L and 4R. The front bumper reinforcement 5 is formed in, for example, a rectangular closed cross-sectional shape when viewed in the vehicle-width direction, and bridged across the front side member 4L on the left side and the front side member 4R on the right side. This front bumper reinforcement 5 is joined to the front side members 4L and 4R via respective crash boxes (not illustrated) disposed, for example, on the front ends of the front side member 4L on the left side and the front side member 4R on the right side.

As illustrated in FIG. 1, when viewed in the vehicle front-rear direction, the stack frame 3 entirely overlaps the front bumper reinforcement 5. In FIG. 1, the range S1 where the stack frame 3 overlaps the front bumper reinforcement 5 is indicated by dashed lines. In this embodiment, the stack frame 3 has an upper end positioned at the same height as that of the upper end of the front bumper reinforcement 5, and the stack frame 3 has a lower end positioned at the same height as that of the lower end of the front bumper reinforcement 5. Here, it is not necessarily required to dispose the stack frame 3 such that it entirely overlaps the front bumper reinforcement 5 when viewed in the vehicle front-rear direction, and it is only necessary to dispose the stack frame 3 such that at least a part of the stack frame 3 overlaps the front bumper reinforcement 5.

As illustrated in FIG. 2, when viewed in the vehicle-width direction, the stack frame 3 entirely overlaps the front side members 4L and 4R. In FIG. 2, the ranges S2 where the stack frame 3 overlaps the front side members 4L and 4R are indicated by dashed lines. In this embodiment, the stack frame 3 has the upper end lower than the upper ends of the front side members 4L and 4R, and the stack frame 3 has the lower end higher than the lower ends of the front side members 4L and 4R. Here, it is not necessarily required to dispose the stack frame 3 such that it entirely overlaps the front side members 4L and 4R when viewed in the vehicle-width direction, and it is only necessary to dispose the stack frame 3 such that at least a part of the stack frame 3 overlaps the front side members 4L and 4R.

Meanwhile, the auxiliary machines 6 include an air conditioning compressor 8, an air compressor 9 that supplies air to the fuel cells, a hydrogen circulation pump 10, a water pump 11 that circulates cooling water, and the like. These auxiliary machines 6 are disposed on the opposite side of the fuel cell stack 2 across the stack frame 3 (that is, below the stack frame 3), and joined to the stack frame 3 by, for example, welding or bolt fastening.

As illustrated in FIG. 4, the air compressor 9 is disposed at approximately the center of the stack frame 3. This air compressor 9 is disposed so as to be fitted within the width in the vehicle-width direction of the stack frame 3 in the vehicle-width direction and within the width in the vehicle front-rear direction of the stack frame 3 in the vehicle front-rear direction. Specifically, the air compressor 9 has a maximum width t5 in the vehicle front-rear direction smaller than the maximum width t2 in the vehicle front-rear direction of the stack frame 3, and the maximum width t5 is within the range of this maximum width t2. In addition, the air compressor 9 has a maximum width w5 in the vehicle-width direction smaller than the maximum width w2 in the vehicle-width direction of the stack frame 3, and the maximum width w5 is within the range of this maximum width w2.

The water pump 11 and the air conditioning compressor 8 are disposed ahead of the air compressor 9 in this order from the right side of the vehicle toward the left side. The water pump 11 is disposed so as to be fitted within the width in the vehicle-width direction of the stack frame 3 in the vehicle-width direction and within the width in the vehicle front-rear direction of the stack frame 3 in the vehicle front-rear direction. Specifically, the water pump 11 has a maximum width t4 in the vehicle front-rear direction smaller than the maximum width t2 in the vehicle front-rear direction of the stack frame 3, and the maximum width t4 is within the range of this maximum width t2. In addition, the water pump 11 has a maximum width w4 in the vehicle-width direction smaller than the maximum width w2 in the vehicle-width direction of the stack frame 3, and the maximum width w4 is within the range of this maximum width w2.

The air conditioning compressor 8 is disposed so as to be fitted within the width in the vehicle-width direction of the stack frame 3 in the vehicle-width direction and within the width in the vehicle front-rear direction of the stack frame 3 in the vehicle front-rear direction. Specifically, the air conditioning compressor 8 has a maximum width t3 in the vehicle front-rear direction smaller than the maximum width t2 in the vehicle front-rear direction of the stack frame 3, and the maximum width t3 is within the range of this maximum width t2. In addition, the air conditioning compressor 8 has a maximum width w3 in the vehicle-width direction smaller than the maximum width w2 in the vehicle-width direction of the stack frame 3, and the maximum width w3 is within the range of this maximum width w2.

Meanwhile, the hydrogen circulation pump 10 is disposed at the rear of the air compressor 9. This hydrogen circulation pump 10 is disposed so as to be fitted within the width in the vehicle-width direction of the stack frame 3 in the vehicle-width direction and within the width in the vehicle front-rear direction of the stack frame 3 in the vehicle front-rear direction. Specifically, the hydrogen circulation pump 10 has a maximum width t6 in the vehicle front-rear direction smaller than the maximum width t2 in the vehicle front-rear direction of the stack frame 3, and the maximum width t6 is within the range of this maximum width t2. In addition, the hydrogen circulation pump 10 has a maximum width w6 in the vehicle-width direction smaller than the maximum width w2 in the vehicle-width direction of the stack frame 3, and the maximum width w6 is within the range of this maximum width w2.

In the thus configured fuel cell vehicle 1, the fuel cell stack 2 is disposed so as to be fitted within the width in the vehicle-width direction of the stack frame 3 in the vehicle-width direction, and, the stack frame 3 entirely overlaps the front side members 4L and 4R when viewed in the vehicle-width direction. In view of this, when an impact is applied to the fuel cell vehicle 1 in the vehicle-width direction, the applied impact can be once received by the front side members 4L and 4R and subsequently by the stack frame 3. This ensures absorption of the impact applied to the fuel cell vehicle 1 in the vehicle-width direction by the front side members 4L and 4R and the stack frame 3 in sequence, thus easing the impact on the fuel cell stack 2. Consequently, the impact on the fuel cell stack 2 in the vehicle-width direction can be reduced.

In addition, the fuel cell stack 2 is disposed so as to be fitted within the width in the vehicle front-rear direction of the stack frame 3 in the vehicle front-rear direction, and the stack frame 3 entirely overlaps the front bumper reinforcement 5 when viewed from the vehicle front side. In view of this, when an impact is applied to the fuel cell vehicle 1 from the vehicle front side, the applied impact can be once received by the front bumper reinforcement 5 and subsequently by the stack frame 3. This ensures absorption of the impact applied to the fuel cell vehicle 1 from the vehicle front side by the front bumper reinforcement 5 and the stack frame 3 in sequence, thus easing the impact on the fuel cell stack 2. Consequently, the impact on the fuel cell stack 2 from the vehicle front side can be reduced.

Furthermore, the air conditioning compressor 8, the air compressor 9, the hydrogen circulation pump 10, and the water pump 11 as the auxiliary machines 6 are each disposed so as to be fitted within the width in the vehicle-width direction of the stack frame 3 in the vehicle-width direction and within the width in the vehicle front-rear direction of the stack frame 3 in the vehicle front-rear direction. In view of this, the impact applied to the fuel cell vehicle 1 in the vehicle-width direction is absorbed by the front side members 4L and 4R and the stack frame 3 in sequence, and the impact applied to the fuel cell vehicle 1 from the vehicle front side is absorbed by the front bumper reinforcement 5 and the stack frame 3 in sequence. Thus, the impacts on these auxiliary machines 6 in the vehicle-width direction and the vehicle front-rear direction can be reduced.

As described above, since the impact on the fuel cell stack 2 in the vehicle-width direction and from the vehicle front side and the impacts on the auxiliary machines 6 in the vehicle-width direction and from the vehicle front side can be each reduced, it is only necessary for the fuel cell stack 2 and the auxiliary machines 6 to have minimum necessary strengths, thus ensuring reduction of the mass and the cost of the fuel cell stack 2 and the auxiliary machines 6.

Furthermore, since the fuel cell stack 2 is joined to the upper side of the stack frame 3, and the auxiliary machines 6 are joined to the lower side of the stack frame 3, the fuel cell stack 2, the auxiliary machines 6, and the stack frame 3 can be provided as one assembly unit. In view of this, assembling properties and mountabilities of these components can be enhanced, thus ensuring, for example, the cost reduction and compatibility with a plurality of vehicle types while improving productivity. Further, if the air conditioning compressor 8, the air compressor 9, the hydrogen circulation pump 10, and the water pump 11 as the auxiliary machines 6 are disposed on the stack frame 3 so as to have small clearances therebetween, the size of the assembly unit can be reduced.

Note that it is not necessarily required to dispose each of the air conditioning compressor 8, the air compressor 9, the hydrogen circulation pump 10, and the water pump 11 such that each component is fitted within the width in the vehicle-width direction of the stack frame 3 in the vehicle-width direction and within the width in the vehicle front-rear direction of the stack frame 3 in the vehicle front-rear direction. It is only necessary to dispose each component such that it is fitted at least one of within the width in the vehicle-width direction of the stack frame 3 in the vehicle-width direction or within the width in the vehicle front-rear direction of the stack frame 3 in the vehicle front-rear direction.

Second Embodiment

Figure 5:
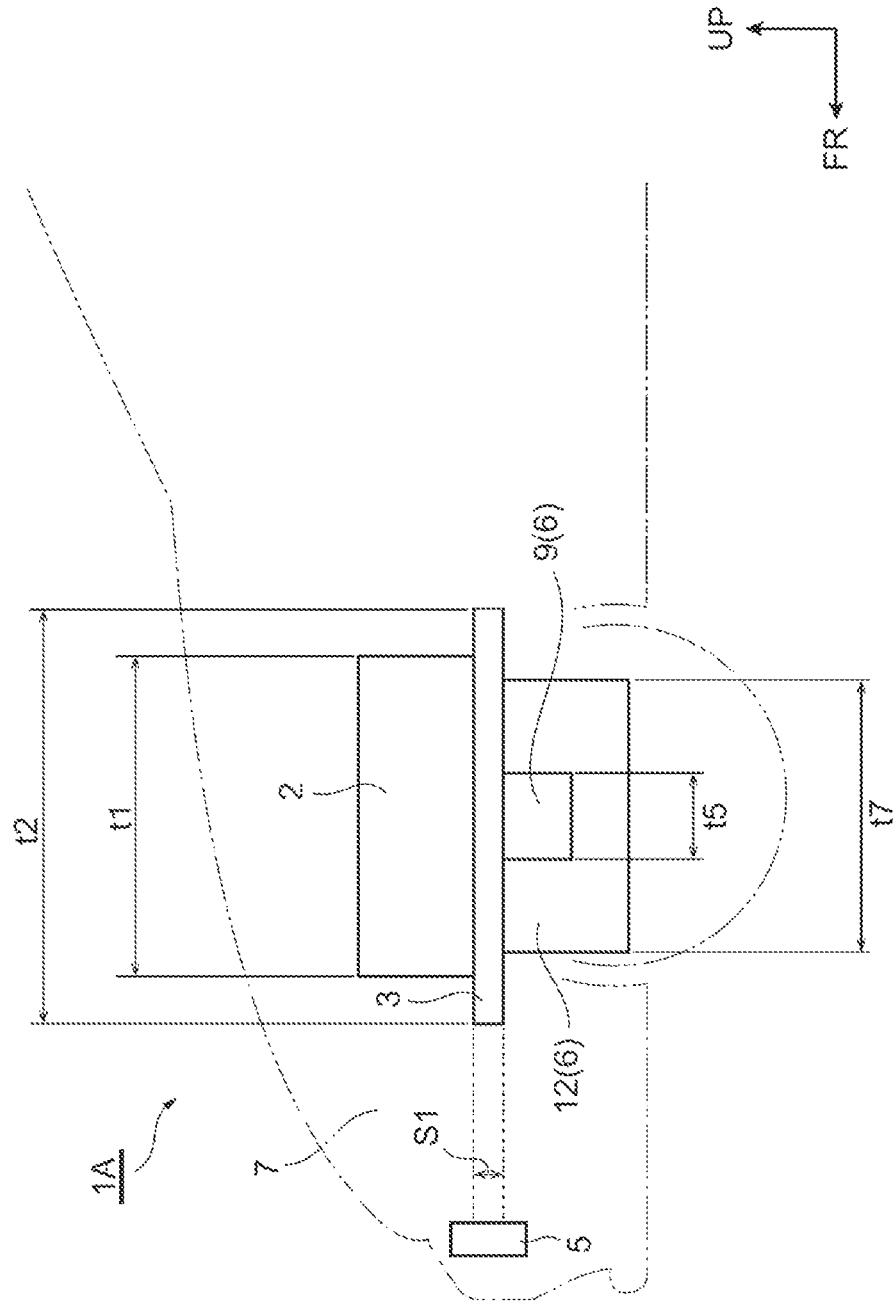
FIG. 5 is a schematic side view of a fuel cell vehicle according to a second embodiment.
Figure 6:
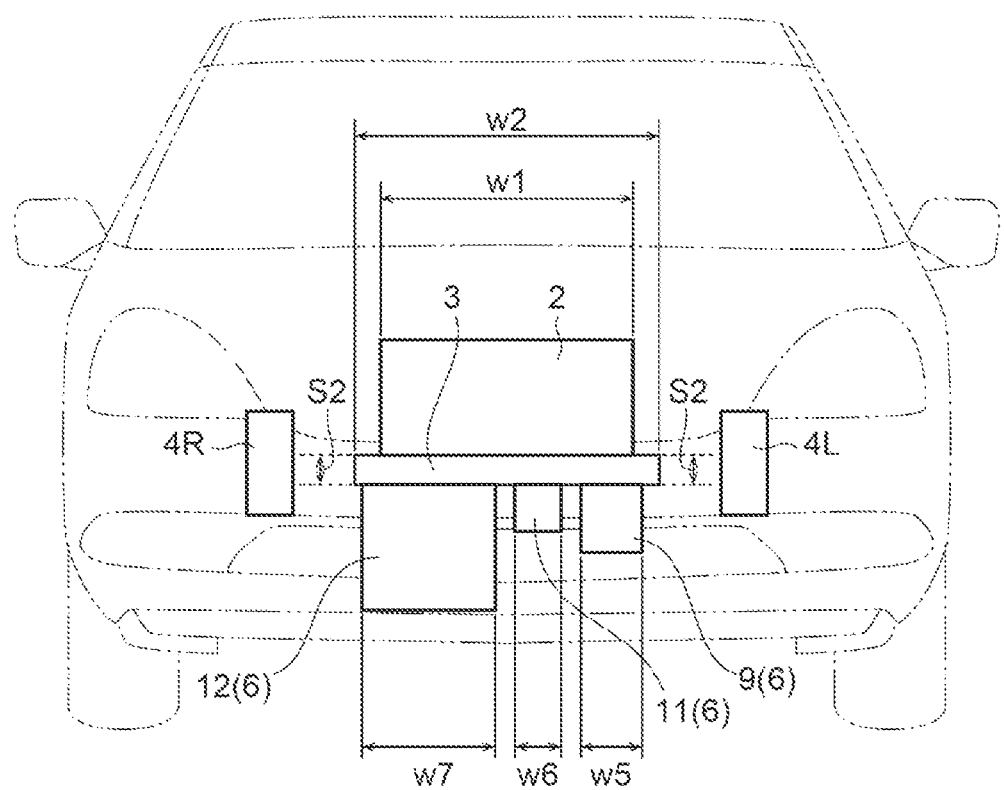
FIG. 6 is a schematic front view of the fuel cell vehicle according to the second embodiment.

FIG. 5 is a schematic side view of a fuel cell vehicle according to the second embodiment, and FIG. 6 is a schematic front view of the fuel cell vehicle according to the second embodiment. A fuel cell vehicle IA of this embodiment is different from the fuel cell vehicle 1 of the above-described first embodiment in that the fuel cell vehicle IA is a front-wheel drive vehicle, and the stack frame 3 is disposed along the horizontal direction. Other configurations are similar to those of the first embodiment, and therefore, description will be given only of the differences.

As illustrated in FIG. 5, the stack, frame 3 is disposed along the horizontal direction. Accordingly, the fuel cell stack 2 mounted to this stack frame 3 is also disposed along the horizontal direction. In addition, the stack frame 3 entirely overlaps the front bumper reinforcement 5 when viewed in the vehicle front-rear direction.

In this the embodiment, the auxiliary machines 6 include the air compressor 9, the water pump 11, a drive motor 12, and the like. As illustrated in FIG. 6, the drive motor 12, the water pump 11, and the air compressor 9 are disposed in this order from the right side toward the left side of the vehicle, and secured to the lower side of the stack frame 3 by, for example, welding or bolt fastening.

The drive motor 12 is disposed so as to be fitted within the width in the vehicle-width direction of the stack frame 3 in the vehicle-width direction and within the width in the vehicle front-rear direction of the stack frame 3 in the vehicle front-rear direction. Specifically, the drive motor 12 has a maximum width w7 in the vehicle-width direction smaller than the maximum width w2 in the vehicle-width direction of the stack frame 3, and the maximum width w7 is within the range of this maximum width w2. In addition, the drive motor 12 has a maximum width t7 in the vehicle front-rear direction smaller than the maximum width t2 in the vehicle front-rear direction of the stack frame 3, and the maximum width t7 is within the range of this maximum width t2.

The thus configured fuel cell vehicle IA provides the operational advantages similar to those of the above-described first embodiment.

While the embodiments of the present disclosure have been described in detail above, the present disclosure is not limited thereto, and can be subjected to various kinds of changes in design without departing from the spirit and scope of the present disclosure described in the claims.

What is claimed is:

1. A fuel cell vehicle comprising:
   a fuel cell stack that includes a plurality of stacked fuel cells;
   a stack frame to which the fuel cell stack is adapted to be mounted, the stack frame being disposed in a front compartment of the vehicle; and
   a pair of front side members disposed on both sides of the stack frame in a vehicle-width direction, the pair of front side members being disposed to extend in a vehicle front-rear direction,
   wherein the fuel cell stack is disposed so as to be fitted within a width in the vehicle-width direction of the stack frame in the vehicle-width direction, and
   wherein at least a part of the stack frame overlaps each front side member when viewed in the vehicle-width direction.

2. The fuel cell vehicle according to claim 1, further comprising
   a front bumper reinforcement disposed ahead of the stack frame,
   wherein the fuel cell stack is disposed so as to be fitted within a width in the vehicle front-rear direction of the stack frame in the vehicle front-rear direction, and
   wherein at least a part of the stack frame overlaps the front bumper reinforcement when viewed from a vehicle front side.

3. The fuel cell vehicle according to claim 2,
   wherein the stack frame entirely overlaps the front bumper reinforcement when viewed from the vehicle front side.

4. The fuel cell vehicle according to claim 1,
   wherein the stack frame entirely overlaps each front side member when viewed in the vehicle-width direction.

5. The fuel cell vehicle according to claim 1, further comprising
   an auxiliary machine adapted to be used for the fuel cell stack,
   wherein the auxiliary machine is disposed so as to be fitted at least one of within the width in the vehicle-width direction of the stack frame in the vehicle-width direction or within the width in the vehicle front-rear direction of the stack frame in the vehicle front-rear direction.

* * * * *

UNITED STATES PATENT AND TRADEMARK OFFICE
CERTIFICATE OF CORRECTION

PATENT NO. : 10,737,565 B2
APPLICATION NO. : 16/226006
DATED : August 11, 2020
INVENTOR(S) : Yugo Ichida and Hiroaki Nishiumi It is certified that error appears in the above-identified patent and that said Letters Patent is hereby corrected as shown below:

On the Title Page

Item (72), inventor 1, city, delete "Seto" and insert --Seto-shi Aichi--, therefor.

Item (72), inventor 2, city, delete "Toyota" and insert --Toyota-shi Aichi--, therefor.

Signed and Sealed this
Fifth Day of January, 2021

Andrei Iancu
*Director of the United States Patent and Trademark Office*